(12) United States Patent
Lang et al.

(10) Patent No.: US 11,072,281 B2
(45) Date of Patent: Jul. 27, 2021

(54) CAMERA SYSTEM AND MIRROR REPLACEMENT SYSTEM

(71) Applicants: Werner Jürgen Lang, Ergersheim (DE); Peter Geissendoerfer, Gallmersgarten (DE); Simon Deffner, Flachslanden (DE); Sebastian Heger, Martkt Nordheim (DE); Florian Schneider, Obernzenn (DE)

(72) Inventors: Werner Jürgen Lang, Ergersheim (DE); Peter Geissendoerfer, Gallmersgarten (DE); Simon Deffner, Flachslanden (DE); Sebastian Heger, Martkt Nordheim (DE); Florian Schneider, Obernzenn (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 251 days.

(21) Appl. No.: 15/843,962

(22) Filed: Dec. 15, 2017

(65) Prior Publication Data
US 2018/0170260 A1 Jun. 21, 2018

(30) Foreign Application Priority Data
Dec. 16, 2016 (DE) .......................... 102016124691.3

(51) Int. Cl.
*H04N 5/225* (2006.01)
*B60R 1/00* (2006.01)
*H04N 7/18* (2006.01)
*H04N 5/38* (2006.01)
*H04N 7/24* (2011.01)

(52) U.S. Cl.
CPC ................. *B60R 1/00* (2013.01); *H04N 5/38* (2013.01); *H04N 7/183* (2013.01); *B60R 2300/40* (2013.01); *B60R 2300/80* (2013.01); *B60R 2300/8046* (2013.01); *H04N 2007/246* (2013.01)

(58) Field of Classification Search
CPC .............................. H04N 5/225; H04N 7/183
See application file for complete search history.

(56) References Cited

U.S. PATENT DOCUMENTS

| 2004/0201703 A1 | 10/2004 | Yang |
| 2015/0296200 A1 | 10/2015 | Grauer et al. |
| 2016/0268716 A1 | 9/2016 | Conger et al. |

FOREIGN PATENT DOCUMENTS

| DE | 10 2013 021 818 | 6/2016 |
| JP | 2005-276357 | 10/2005 |
| KR | 20150038032 | 4/2015 |

*Primary Examiner* — Y Lee
(74) *Attorney, Agent, or Firm* — Cozen O'Connor (57) ABSTRACT

A camera system (1) for a commercial vehicle has at least one image capture unit (3) for capturing an image, an image reproduction unit (8) for reproducing the captured image at least one functional unit (4.1, 4.2) for performing a vehicle function and at least one control unit (2) for outputting a control signal. The camera system (1) transmits a video signal between the control unit (2) and the image reproduction unit (8) and controls the image capture unit (3) and the functional unit (4.1, 4.2) by a control signal outputted from the control unit (2). The functional interface (6.1) is provided between the image capture unit (3) and the functional unit (4.1, 4.2), via which functional interface (6.1), image capture unit (3) and the functional unit (4.1, 4.2) are coupleable with each other and decoupleable from each other.

22 Claims, 5 Drawing Sheets

FIG. 5

CAMERA SYSTEM AND MIRROR REPLACEMENT SYSTEM

BACKGROUND OF THE INVENTION

1. Field of the Invention

The present invention generally relates to a camera system for a vehicle, in particular to a commercial vehicle, and a mirror replacement system with a camera system.

2. Description of the Related Art

With respect to automobiles, so-called fields of view are legally prescribed dependent on the type of the automobile, such as motorcycles, vehicles for passenger transport, vehicles for transport of goods, etc., which fields of view have to be depicted by a device for indirect view and which fields of view have to be visible at any time for a driver sitting on a driver seat by means of the device for indirect view. Usually, the devices for indirect view are constituted by mirrors.

In recent times, such devices for indirect view are more and more replaced and/or added by cameras and image capture units, respectively, which are configured such that a camera attached to the outside of the vehicle captures an image of the environment of the vehicle and the image, if applicable after image processing, is depicted visibly for the driver on a reproduction device attached to the interior of the vehicle.

In common cameras systems, the camera may have further additional functions besides the capturing of images, which additional functions are provided by so-called functional units and, occasionally, may be dependent on the operating mode of the vehicle. For example, a rear view camera may be switched on with engaging the reverse gear, an infrared (IR)-lighting of a camera may be switched on with beginning twilight which is detected by a light sensor, or an image section may be depicted in an augmented manner with cornering which is indicated by a flashlight signal. For this, in such common camera systems, both the camera and the corresponding functional unit are separately connected with a control unit and the control electronics of a control unit such that both camera and the functional unit are separately controlled by the control unit. Such a separated control unit results in that a corresponding camera system has a complex structure due to a plurality of doubled system components such as cables, conductors and electronic control modules.

Additionally, normally, further functional units are provided at the vehicle which are possibly provided in spatial proximity to the capture unit of the camera system, but do not relate to the function of the camera system, such as, for example, the turn signal, different sensors (distance sensor, rain sensor) etc. As well, these also have individual system components for supply of the components by a control unit, such that the supply components for the camera system provided in the vehicle and such functional units, as conductors, are often provided individually and, thus, arranged in parallel for more components.

SUMMARY OF THE INVENTION

Therefore, it is an object of the invention to provide a camera system which has a simple structure and with which an easy component exchange is possible, if individual components break down.

This object is solved by a camera system with the features of claim 1 and a mirror replacement system with the features of claim 15. Preferred embodiments are given in the dependent claim.

The invention is based on the idea to couple at least one functional unit with an image capture unit of a vehicle such that a control signal is used at least partially for controlling the image capture unit and also with another or the same part for controlling the functional unit. Thus, the control unit outputs a control signal which controls both the image capture unit and the functional unit. This control signal may also be composed of two or more, for example, originally separated, control signals which are outputted from the same or from different of the one or more control units, i.e., for example, a separate control unit may be provided for the image capture unit and a separate control signal may be provided for a functional unit as "the control signal". In case that the control unit comprises multiple sub-units and in case that multiple control units are provided, respectively, these may be arranged in the vehicle in a combined manner (for example, in an on-board computer) or may be provided, if applicable, as spatially and physically separated units. Therefore, both the control of the image capture unit and the control of the functional unit are performed by use of the control signal which is outputted from the one or more control units.

The at least one functional unit is adapted to carry out vehicle functions. Generally spoken, the term "vehicle function" includes all functions of a vehicle which take place at, around and/or in the vehicle such as a vehicle lighting function, a vehicle signal function (for instance a turn signal, a horn signal), a breaking function/acceleration function, etc. Also auxiliary functions for various components attached to the vehicle, such as an illumination for a camera, fall within the sense of a vehicle function. For transmitting the control signal outputted from the control unit, a functional interface is provided between the at least one image capture unit and the at least one functional unit, via which functional interface the at least one image capture unit and the at least one functional unit are coupleable with each other and decoupleable from each other. Thus, in case of a failure of either the image capture unit or the functional unit, both units may also be operated separately from each other. In particular, only one common conductor- and wiring- or transmitting-system is required for the control of the camera system and the at least one functional unit. Thus, the at least one functional unit is controlled by a signal which is directed through the capture unit and, thus, is transmitted to the at least one functional unit.

Preferably, the control signal outputted from the control unit is transmitted via the image capture unit to the functional unit.

If the at least on functional unit is controlled by use of a control signal which also controls the image capture unit and which is relayed from the image capture unit to the corresponding functional unit, the number of system components may substantially be reduced compared to common camera systems and, thus, a camera system with a simple and at the same time compact configuration may be provided which, thereby, has low system costs, because cables and conductors, respectively, and electronic control modules are saved and reduced, respectively, compared to common camera systems.

Additionally or alternatively, the at least one control unit is adapted to output and to receive at least one video signal making it possible to transmit the video signal from the image capture unit via the control unit to the image reproduction unit. This has the advantage that the control unit may perform processing of the video signal, such as compressing the transmitted data, and, thus, may output signals which are advantageous for the reproduction of the video data on the image reproduction unit.

Preferably, at least one capture interface is provided in the camera system between the control unit and the image capture unit, which is adapted for transmitting the at least one video signal from the image capture unit to the control unit and for transmitting the at least one control signal from the control unit to the image capture unit. By means of the capture interface, a stable and reliable signal transmission is possible.

Preferably, at least one capture interface is provided between the image capture unit and the image reproduction unit, which is adapted for transmitting the at least one video signal from the image capture unit to the image reproduction unit and for transmitting at least one control signal from the image reproduction unit to the image capture unit.

In a preferred embodiment, the at least two interfaces are adapted for separately transmitting control signals to the at least one control unit and video signals to the image reproduction unit. Separated interfaces for the transmission of both video and control signals ensure a flexible structure and an easy maintenance of the camera system.

In a further alternative embodiment, the at least one common interface is adapted for transmitting control signals to the at least one control unit and video signals to the at least one image reproduction unit. A common interface for the transmission of both video and control signals saves installation space and, thus, ensures a compact camera system.

In a further preferred embodiment, the control unit is integrated in the image capture unit, what does not only save installation space and, thus, not only ensures a compact configuration of the whole camera system, but also supersedes the at least one capture interface and, thus, results in a more compact and reliable camera system. At the same time, the same components of the control unit and the image capture unit may be provided in respective common component, what results in a cost-efficient camera system. The providing of the control unit in the image capture unit is particularly favorable, if the functional unit performs a function which is coupled to the camera function, such as an illumination of the captured area of the camera.

Further preferably, the camera system has at least one reproduction interface between the control unit and the image reproduction unit, which is adapted for transmitting at least one video signal from the control unit to the image reproduction unit. By use of the reproduction interface, a stable and reliable signal transmission is ensured.

Preferably, the camera system has at least two functional interfaces, wherein the at least two functional interfaces are electrically and/or signal-technically and/or mechanically compatible. Additionally or alternatively, the camera system has at least two capture interfaces, wherein the at least two capture interfaces are electrically and/or signal-technically and/or mechanically compatible. Further additionally or alternatively, the camera system has at least two reproduction interfaces, wherein the at least two reproduction interfaces are electrically and/or signal-technically and/or mechanically compatible. This allows the simple connecting and exchanging of functional units among each other or, for instance, the individual adaptation and selection of functional units, as desired.

Preferably, in case of at least one functional interface and at least one capture interface, the at least one functional interface and the at least one capture interface are electrically and/or signal-technically and/or mechanically compatible, or in case of at least one functional interface and at least one reproduction interface, the at least one functional interface and the at least one reproduction interface are electrically and/or signal-technically and/or mechanically compatible, or in case of at least one capture interface and at least one reproduction interface or in case of at least one capture interface, at least one functional interface and at least one reproduction interface, the at least one capture interface and the at least one reproduction interface or the at least one capture interface, the at least one functional interface and the at least one reproduction interface are electrically and/or signal-technically and/or mechanically compatible.

Multifunctional compatibility of the interfaces among each other allows a simple connecting of the different system units by use of different interfaces without the definition of a specific plug-in position.

The various interfaces may be integrated directly in the image capture unit, for example its housing, if required, for instance for saving installation space.

In a preferred embodiment, the control unit is integrated in the image reproduction unit, what does not only save installation space and, thus, allows a compact configuration of the whole camera system, but also does not require the reproduction interface and, thus, results in a more compact and reliable camera system. At the same time, thereby, the same components of the control unit and the image reproduction unit may be provided in a respective component, what leads to a cost-saving camera system.

Preferably, the vehicle function which is performed by the functional unit provides at least one additional function for the image capture unit which does not comprise image capturing. For example, the at least one additional function comprises a lighting (visible or infrared (IR)-lighting) for the image capture unit for illuminating the captured area of the image capture unit, a cleaning of the optics (lenses) of the image capture unit for ensuring optimal image acquisition, an additional heating for the image capture unit for preventing/removing the generation of condensed water in the image capture unit or a protection apparatus such as a shutter for the optics (lenses) of the image capture unit for protection against damage by foreign objects. This has the advantage that the image capture unit, beyond the capturing of images, has a plurality of special functions, which further improve the image capture quality of the image capture unit or the adaptation of the pictures/recordings to legal statutory provisions/legal guidelines/regulations.

Alternatively or additionally, the vehicle function performed by the functional unit provides at least one additional function for the vehicle and/or the driver of the vehicle which does not comprise image capturing. For instance, the at least one additional function comprises a signal horn, a lighting of the vehicle or a distance sensor of the vehicle and, thus, can support the driver and/or supply data for a driver assistance system.

Preferably, at least one of the interfaces is sealed against the environment. This prevents the entering of foreign objects/-substances, such as water, humidity, dirt, such as dust, and, thus, improves the reliability and the life cycle of the interfaces and leaves more freedom with respect to their arrangement at the vehicle, because the sealing has to be less considered due to the installation or the posture per se. For this purpose, any kind of sealing may be provided for such interfaces.

Preferably, an individual plug-in connection is provided for each interface. This allows a separate exchange of the respective plug-in connection, such as in the case of a failure of the plug-in connection or an extension of the camera system with further function or system units via further interfaces.

Alternatively or additionally, at least two interfaces are provided and for at least two of the at least two interfaces a common plug-in connection is provided, allowing a compact configuration of the camera system in that the at least two interfaces are arranged closely to each other in a small space.

Preferably, the plug-in connection is mechanically lockable. In this way, it can be prevented that cables or conductors, which are plugged in the plug-in connection and their plug-in positions, are released (loosened), such as due to vibrations or agitations which are transmitted from the vehicle to the camera system.

In a preferred embodiment, the control unit and/or the functional unit and/or the image capture unit are disposed in a common housing what saves installation space and, thus, allows a compact configuration of the whole camera system.

In a further preferred embodiment, the control unit and/or the functional unit and/or the image capture unit form assemblies which are separated with respect to their housings, what leads to an easy to maintain camera system, because the components referring to the individual system units are well accessible and, further, different requirements to the housings of the individual system units (sealability, material, etc.) can be easily realized. Preferably, the control unit and/or the functional unit and/or the image capture unit are disposed in spatial and direct proximity, respectively, to each other. Spatial and direct proximity, respectively, presently means that there is a very small and no distance, respectively, between the respective system units. If there is no distance, the housings of the respective system components contact each other. When there is a small distance, a distance of a few millimeters or centimeters, preferably below 0.5 m, further preferably below 0.1 m and still further preferably in a range from 1 to 10 millimeters, preferably 2 to 3 millimeters, is meant.

The camera system according to the invention for instance, may be used in mirror replacement systems for vehicles, in particular commercial vehicles, in order to provide a continuous and permanent image information of the environment of the vehicle in real time on a display apparatus inside the vehicle and/or outside the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention are described below with reference to the accompanying drawings, wherein the same components are provided with the same reference numbers.

DETAILED DESCRIPTION OF THE PRESENTLY PREFERRED EMBODIMENTS

Figure 1:
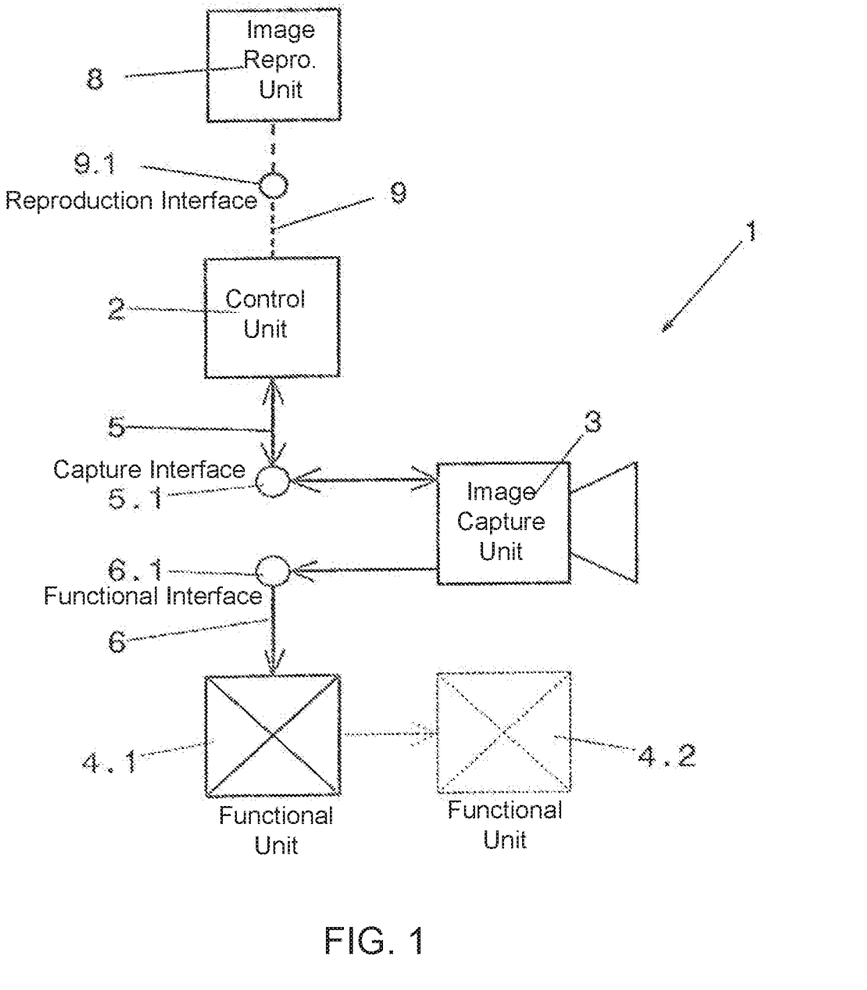
FIG. 1 a schematic structure of a camera system according to a first embodiment, FIG. 2 a schematic structure of a camera system according to a second embodiment, FIG. 3 a schematic structure of camera system according to a third embodiment, FIG. 4 a schematic structure of a camera system according to a fourth embodiment, and FIG. 5 an exemplary arrangement of a plug-in connection for different interfaces of a camera system according to the invention.

In FIG. 1, a camera system 1 for a vehicle (not shown) according to a first embodiment is shown. The camera system 1 has a control unit 2, an image capture unit 3, a first functional unit 4.1 and an image reproduction unit 8. The control unit 2 serves for outputting and/or receiving control signals and video signals and, for example, may be an on-board computer or an ECU (electronic control unit). The control unit 2 may be provided as a separate system component, but may also be provided in the housing of the image capture unit 3 or the image reproduction unit 8.

The image capture unit 3 serves for capturing images around a vehicle and/or the inside of a vehicle and may be a camera such as a digital camera with a CCD-technology or a CMOS-technology or any other camera having a high resolution. The first functional unit 4.1 generally provides additional functions for the image capture unit, the vehicle and/or the driver and may be any imaginable unit of a vehicle, which is associated with a function which differs from the function of the image capture unit such as various sensors, various signals lights such as a turn signal or a reversing light (back-up lamp), or an illumination of the image capture unit, such as an infrared (IR)-light. The image reproduction unit 8 may be a display device as a display or a monitor such as a LCD-, TFT-, or LED-monitor.

A capture interface 5.1 is arranged between the image capture unit 3 and the control unit 2. The capture interface 5.1 may be provided at the image capture unit 3 and/or the control unit 2. The capture interface 5.1 is configured such that it transmits signals 5 of the control unit 2 to the image capture unit 3 and signals 5 of the image capture unit 3 to the control unit 2. Therefore, it is possible to transmit signals in both directions between the control unit 2 and the image capture unit 3 by use of the capture interface 5.1. The signals 5 transmitted from the capture interface 5.1 may be control signals and/or video signals. Control signals may be signals for controlling the image capture unit 3, such as a signal for switching on/off the image capture unit when starting/stopping the engine of the vehicle or a signal for setting a specific area to be captured (recording area) of the image capture unit 3 such as during cornering which is announced by a turn signal operation. Video signals may be signals for transmitting images which are captured by the image capture unit 3. A video signal is a serial arrangement of electric voltages, by which image signals (image brightness and color), blanking pulses and synchronic signals are transmitted. Processing of the video data transmitted by the video signal occurs by means of a processor, such as a CPU (central processing unit) or a microprocessor (not shown) which is commonly arranged in the control unit.

A reproduction interface 9.1 is arranged between the image capture unit 3 and the image reproduction unit 8. The reproduction interface 9.1 may be provided at the image capture unit 3 and/or the image reproduction unit 8. The reproduction interface 9.1 is configured such that it transmits signals 9 of the control unit 2 to the reproduction unit 8 and, preferably, also signals 9 of the reproduction unit 8 to the control unit 2. Therefore, it is possible to transmit signals 9 between the control unit 2 and the reproduction unit 8 by use of the reproduction interface 9.1, preferably, in both directions. The signals 9 transmitted from the reproduction interface 9.1 may be control signals and/or video signals. Control signals can be signals for controlling the reproduction unit 8, such as the switching on/off of the reproduction unit 8 or the setting of a specific display area of the reproduction unit 8. Video signals may be signals for displaying image data which are captured by the image capture unit 3 and which are processed by the processor.

A functional interface 6.1 is arranged between the image capture unit 3 and the functional unit 4.1. The functional interface 6.1 may be provided at the image capture unit 3 and/or the functional unit 4.1. The functional interface 6.1 is configured such that it transmits signals 6 from the image capture unit 3 to the functional unit 4.1. The signals transmitted from the functional interface 6.1 may be signals of the control unit 2 which are used for controlling the image capture unit 3 and the functional unit 4.1. Doing so, the control unit 2 outputs at least one control signal which is transmitted via the capture interface 5.1 to the image capture unit 3 for controlling the image capture unit 3. The signal transmitted from the control unit 2 is transmitted and forwarded, respectively, via the functional interface 6.1 from the image capture unit 3 to the functional unit 4.1 for controlling the functional unit 4.1. For controlling the functional unit 4.1, it can be necessary that the control signal transmitted to the functional unit 4.1 is processed and converted, respectively, in the image capture unit 3 by means of a processor (not shown). However, it is also possible that the image capture unit 3 and the functional unit 4.1 are controlled by use of the same control signal. Thus, the functional unit 4.1 is controlled by a signal which passes through the image capture unit 3 and is transmitted from the image capture unit 3 to the functional unit 4.1.

In FIG. 1, a further functional unit 4.2 is shown, which is depicted with dashed lines. Further, the signal of the control unit 2 by use of which the functional 4.1 is controlled may be used for controlling the further functional unit 4.2. For controlling the further functional unit 4.2 it can be necessary that the control signal transmitted to the functional unit 4.2 is processed and converted, respectively, in the functional unit 4.1 by means of a processor (not shown).

The functional units 4.1, 4.2 are units and system components, respectively, which perform no camera function, i.e., no image capturing. The functional units 4.1, 4.2 rather provide additional functions for the image capture unit 3 and/or the vehicle and/or the driver. For instance, the additional functions of the functional units 4.1, 4.2 may have a lighting (visible or infrared (IR)-lighting) for the image capture unit 3 for illuminating the captured area of the image capture unit 3, a cleaning of the optics (lenses) of the image capture unit 3 for ensuring optimal image acquisition, an additional heating for the image capture unit 3 for preventing/removing the generation of condensed water in the image capture unit 3 or a protection apparatus such as a shutter for the optics (lenses) of the image capture unit 3 for protection against damage by foreign objects. Moreover, the additional functions of the functional units 4.1, 4.2 may comprise a signal horn, a lighting of the vehicle or a distance sensor of the vehicle.

With interfaces, i.e., the capture interface 5.1, the functional interface 6.1 and the reproduction interface 9.1, devices are meant with which two partial systems may be mechanically and signal-technically coupled, i.e., for instance, plug and associated connector with the respective plug-in positions and/or poles.

The mode of operation of camera system 1 according to the first embodiment is explained below on the basis of an example in which the functional unit 4.1 is a light sensor of the image capture unit 3 and the functional unit 4.2 is a IR-lighting of the image capture unit 3. It is an object of the light sensor 4.1 to detect the quantity of light in the captured area of the image capture unit 3 and, in case of a falling below a predetermined threshold value for a luminous intensity (measured in the SI-unit Lux), outputs a signal for switching on a lighting, namely an IR-lighting of the image capture unit 3. As soon as the control unit 2 outputs a control signal for switching on the image capture unit 3 during starting of the engine of the vehicle, this control signal—if applicable, after processing by means of a processor in the image capture unit 3—is also used for controlling the light sensor 4.1. If the light sensor 4.1 detects that a quantity of light and a luminous intensity, respectively, is present in the captured area of the image capture unit 3 which requires an illumination of the image capture unit 3 for recording suitable images from, for instance, the environment around the vehicle, the light sensor 4.1 outputs a signal, which causes a switching-on of the IR-lighting 4.2. In this way, a single control signal for controlling of both the image capture unit 3 and the functional units 4.1, 4.2 may be used. This allows a simple and at the same time compact structure of the camera system 1 according to the invention with reduced system costs, as cables and conductors, respectively, and electronic control modules are saved and reduced, respectively, compared to common camera systems.

Generally, controlling of the image capture unit 3 as well as of the functional units 4.1, 4.2, thus, occurs by use of a vehicle bus such as, for instance, CAN, LIN, Ethernet or other bus systems, and, accordingly, by means of a system for data transmission between several members, here the control unit 2, the image capture unit 3, the first functional unit 4.1 and the image reproduction unit 8, via a common transmission path. The image capture unit 3 and the functional units 4.1, 4.2, thus, are configured such that they are coupled to each other. For instance, this coupling may occur with respect to the function of the image capture unit 3 and the functional units 4.1, 4.2. However, at least the image capture unit 3 may also be operated without the functional units 4.1, 4.2. Referring to the above example, the image capture unit 3 may also continue to function, even if the IR-lighting and/or the light sensor are damaged. The image capture unit 3 and the functional units 4.1, 4.2 are decoupleable (releasable) from each other.

Figure 2:
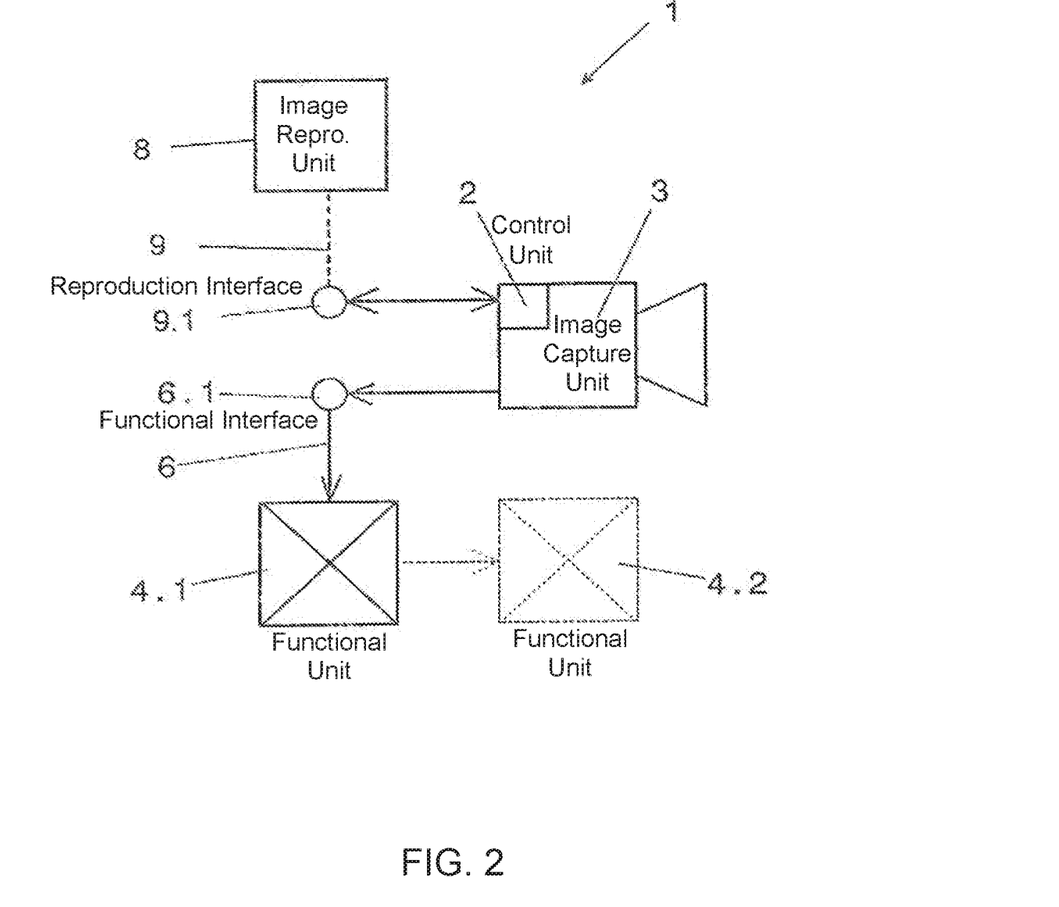

In FIG. 2, a second embodiment of the camera system 1 according to the invention is shown. The second embodiment shown in FIG. 2 differs from the first embodiment in that the control unit 2 is integrated in the image capture unit 3. Thus, only a reproduction interface 9.1 which is suitable for transmitting at least one video signal is present between the image capture unit 3 and the image reproduction unit 8. Alternatively, the control unit 2 may also be integrated in the reproduction unit 8 (not shown). In this case, only the capture interface 5.1 is present between the image capture unit 3 and the image reproduction unit 8, which is suitable for transmitting both at least one video signal and at least one control signal.

Figure 3:
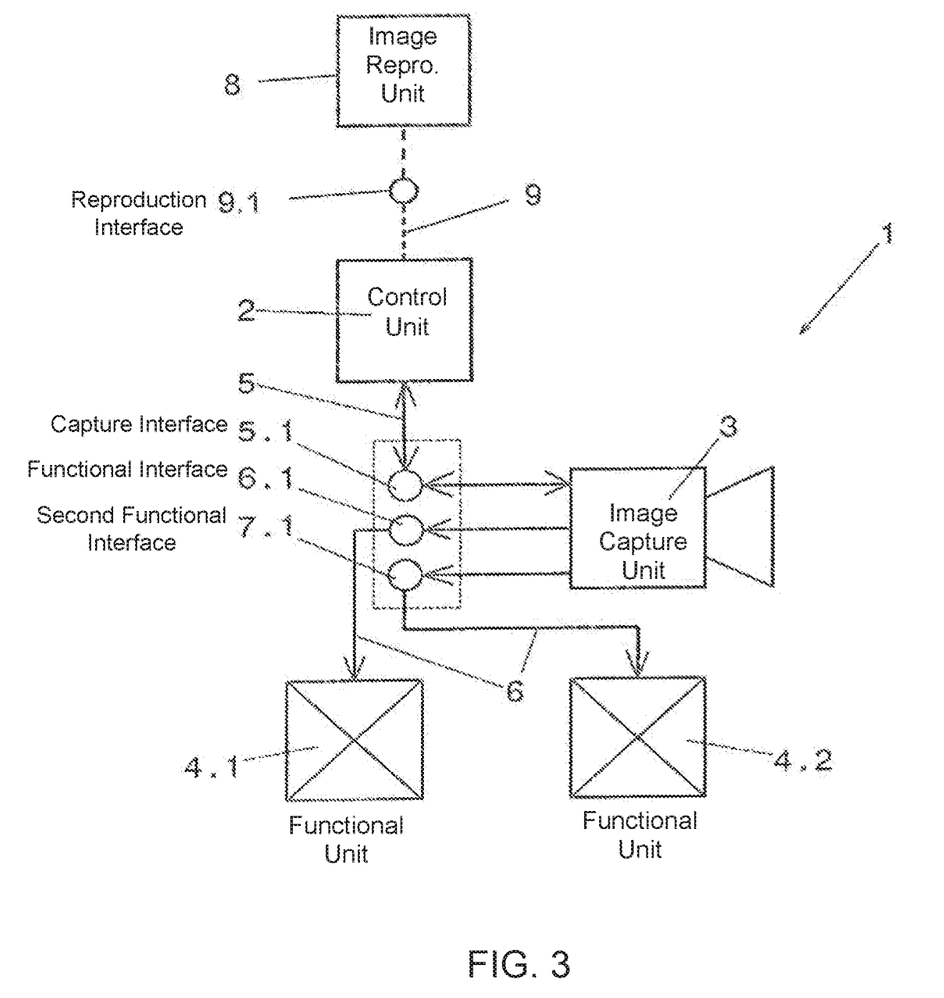

In FIG. 3, a third embodiment of the camera system 1 according to the invention is shown. The third embodiment shown in FIG. 3 differs from the first embodiment shown in FIG. 1 in that the second functional unit 4.2 is not controlled by use of a signal which is relayed via the first functional unit 4.1 to the second functional unit 4.2, but by use of a signal of the control unit 2 which is transmitted via a further, second functional interface 7.1. In this case, the functional interface 4.1 is called a first functional interface 4.1. The signal transmission of the control unit 2 via the image capture unit 3 to the functional interface 4.2 occurs in the same manner as from the control unit 2 via the image capture unit 3 to the first functional interface 4.1, which is described above with respect to the first embodiment.

Figure 4:
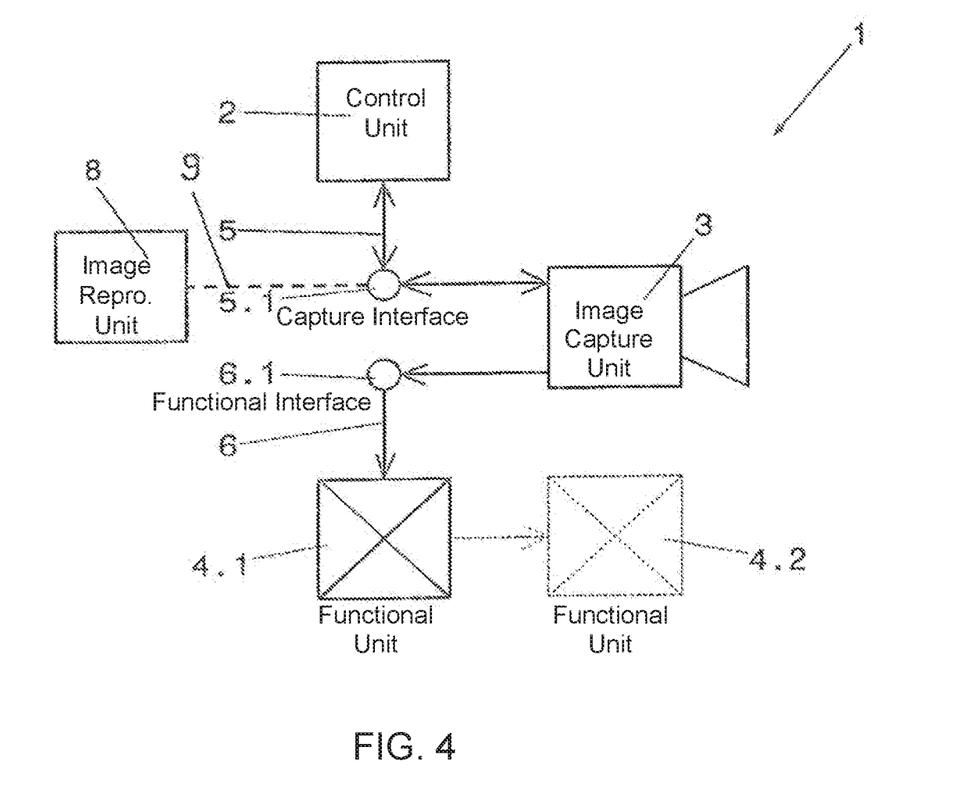

In FIG. 4, a fourth embodiment of a camera system 1 according to the invention is shown. The fourth embodiment shown in FIG. 4 differs from the first embodiment shown in FIG. 1 in that the image reproduction unit 8 is directly connected/coupled to the image capture unit 3 via the capture interface 5.1. With the embodiment shown in FIG. 4, the interface 5.1 serves for transmitting and/or receiving control signals to and from, respectively, the control unit 2 and, at the same time, the transmitting of video signals from the image capture unit 3 to the image reproduction unit 8. However, it is also imaginable that the transmission of control signals and video signals occurs via separate interfaces.

It is common to the embodiments shown in FIG. 1 to FIG. 4 that they have at least one first functional interface 6.1 which is suitable for transmitting a control signal 6 from the image capture unit 3 to the first functional unit 4.1 and at least one reproduction interface 9.1, which is suitable for transmitting a video signal 9 from the control unit 2 (FIGS. 1 and 3) or the image capture unit 3 (FIGS. 2 and 4) to the image reproduction unit. The capture interface 5.1 shown in FIG. 1 and FIG. 3 is suitable for transmitting signals in both directions, namely at least one video signal from the image capture unit 3 to the control unit 2 and at least one control signal from the control unit 2 to the image capture unit 3. Further, it is also imaginable that the interfaces 9.1 and 6.1, 7.1 are suitable for transmitting signals in both directions.

Even if merely one capture interface 5.1 is shown in FIGS. 1, 3 and 4 and merely one reproduction interface 9.1 is shown in FIGS. 1 to 3, it is also imaginable to provide more than one capture interface 5.1 and reproduction interface 9.1 in the camera systems according to the invention. Further, it is imaginable that the functional interface 6.1 of the camera systems 1 according to the invention may also transmit signals from the functional unit 4.1 to the image capture unit 3 and, thus, may allow a signal transmission in both directions between the image capture unit 3 and the functional unit 4.1.

The transmission of video signals occurs in FIGS. 1 and 3 from the control unit 2 to the image reproduction unit 8 and in FIGS. 2 and 4 from the image capture unit 3 to the image reproduction unit 8. Additionally, the image reproduction unit may be configured for outputting video signals and/or other signals to the control unit 2 and the image capture unit 3, respectively.

Further, a random (arbitrary) number of functional units 4.1, 4.2 . . . 4.n may be integrated and added to the camera system 1 according to the invention.

Figure 5:
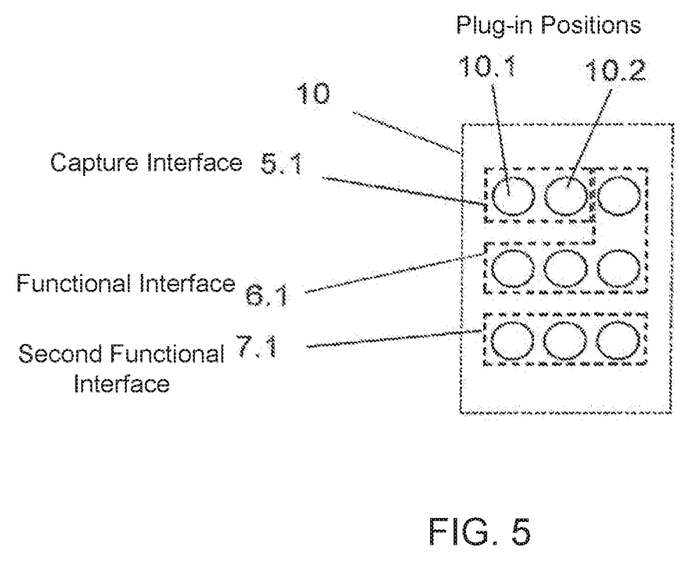

Interfaces 5.1, 6.1, 9.1 may be plug-in connections. In FIG. 5, an example for a plug-in connection 10 of the interfaces 5.1, 6.1 and 7.1 is shown. The plug-in connection 10 shown in FIG. 5 has nine plug-in positions 10.1, 10.2, . . . 10.9 (only plug-in positions 10.1, 10.2 are numbered). In the plug-in positions 10.1, 10.2, . . . 10.9, the connectors of various system units, i.e., the control unit 2, the capture unit 3 and/or the functional unit 4.1, 4.2, can be plugged in, wherein three plug-in positions are respectively arranged in a row and the plug-in connection accordingly has three rows with respective three plug-in positions. In the first row of the plug-in connection (the top-most row of plug-in positions in FIG. 5), two plug-in positions are provided for the group of video signals which are transmitted by use of the capture interface 5.1. The plug-in positions for the transmission of video signals may be disposed adjacent to each other, selectively left (as shown in FIG. 5) or right or may also be separately disposed from each other. The remaining plug-in position in the first row in FIG. 5 together with the one in the second row (middle row of plug-in positions in FIG. 5) is provided for the transmission of signals which are transmitted via the first functional interface 6.1. In the third row (lower-most row of plug-in positions in FIG. 5) only plug-in positions for the transmission of signals which are transmitted via the second functional interface 7.1 are provided. Even if not shown in FIG. 5, the plug-in connection may have further plug-in positions or further rows of plug-in positions, for instance for the reproduction interface 9.1 for the transmission of signals to and/or from the image reproduction unit 8 and/or for further functional units 4.3, 4.4, . . . 4.n.

The interfaces 5.1, 6.1, 7.1, 9.1 may be provided in a common plug-in connection 10 as shown in FIG. 5. It is also imaginable to provide only the functional interface 6.1 and the capture interface 5.1 or the functional interface 6.1 and the reproduction interface 9.1 or the capture interface 5.1 and the reproduction interface 9.1 in a common plug-in connection and to provide the respective remaining interface in a plug-in connection which is separated from the common plug-in connection. Alternatively, each of the interfaces 5.1, 6.1, 7.1, 9.1 may also be provided as a separate plug-in connection. Also, more or less than nine plug-in positions may be provided in a plug-in connection. The interfaces 5.1, 6.1, 7.1, 9.1 are configured such that they are protected against the entering of water, humidity and dirt, such as dust, by means of a respective sealing device, what improves the reliability of the interfaces 5.1, 6.1, 7.1, 9.1 and their life cycle. Further, interfaces 5.1, 6.1, 7.1, 9.1 are electrically, such as via the pin assignment and/or the kind of signal (signal-technically), and/or mechanically, such as via the connector geometry, compatible. For instance, all interfaces of at least one type, that is, at least all functional interfaces 6.1, at least all reproduction interfaces 9.1 or at least all capture interfaces 5.1 may be electrically and/or signal-technically and/or mechanically compatible. Further, the individual interfaces 5.1, 6.1, 7.1, 9.1 may also be electrically and/or signal-technically and/or mechanically compatible to each other in all imaginable combinations. This allows a flexible usage of the different plug-in connections, independent on the structure of the camera system 1. The plug-in connection 10 as a whole and/or the individual plug-in positions 10.1, 10.2, . . . of the plug-in connection 10 may be mechanically lockable such that a loosening (releasing) of cables, which are inserted into the plug-in position, is prevented.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camera system for a vehicle, in particular a commercial vehicle, comprising:
   at least one image capture unit for capturing at least one image;
   at least one image reproduction unit for reproducing the at least one image captured by the image capture unit;
   a first functional unit for performing a vehicle function comprising a shutter configured to protect the image capture unit against damage by foreign objects, and a second functional unit for performing a second vehicle function comprising illuminating with Infrared (IR) light an area to be captured by the image capture unit; and
   at least one control unit for outputting at least one control signal,
   wherein the camera system is configured to transmit at least one video signal between the image capture unit and the image reproduction unit and is configured to control the image capture unit and the first and second functional units by use of the same single control signal outputted from the control unit, the same single control signal being passed through the image capture unit to the functional units and being not transmittable back from the functional units to any one of the camera system units,
   wherein at least one functional interface is provided between the at least one image capture unit and the first functional unit, via which functional interface, the at least one image capture unit and the first functional unit are coupleable with each other and decoupleable from each other, wherein the control signal outputted from the control unit is transmitted through the image capture unit to the first functional unit and is relayed via the first functional unit to the second functional unit via a common transmission path,
   wherein the vehicle functions performed by the first and second functional units provide-additional functions for the image capture unit, which additional function comprises a cleaning of optics of the image capture unit for ensuring optimal image acquisition, and wherein a heating is performed by the image capture unit for preventing or removing the generation of condensed water in the image capture unit, and
   wherein the control unit and/or the first functional unit and/or the image capture unit form separated assemblies with respect to their housings.

2. The camera system according to claim 1, comprising at least two functional interfaces, wherein the at least two functional interfaces are electrically and/or signal-technically and/or mechanically compatible.

3. The camera system according to claim 1, wherein the at least one control unit is configured to output and receive at least one video signal.

4. The camera system according to claim 3, wherein at least one capture interface is provided between the control unit and the image capture unit, wherein the capture interface is configured for transmitting the at least one video signal from the image capture unit to the control unit and for transmitting at least one control signal from the control unit to the image capture unit.

5. The camera system according to claim 4, further comprising at least two capture interfaces, wherein the at least two capture interfaces are electrically and/or signal-technically and/or mechanically compatible.

6. The camera system according to claim 5, wherein the at least one capture interface are electrically and/or signal-technically and/or mechanically compatible.

7. The camera system according to claim 4, wherein the at least one functional interface and the at least one capture interface are electrically and/or signal-technically and/or mechanically compatible.

8. The camera system according to claim 4, wherein for each interface an individual plug-in connection is provided.

9. The camera system according to claim 4, wherein at least two interfaces are provided and a common plug-in connection is provided for at least two of the at least two interfaces.

10. The camera system according to claim 1, wherein at least one capture interface is provided between the image capture unit and the image reproduction, wherein the capture interface is configured for transmitting the at least one video signal from the image capture unit to the image reproduction unit and transmitting at least one control signal from the image reproduction unit to the image capture unit.

11. The camera system according to claim 10, wherein at least two interfaces for separately transmitting control signals to the at least one control unit and video signals to the image reproduction unit are provided.

12. The camera system according to claim 10, wherein at least one common interface for transmitting control signals to the at least one control unit and video signals to the at least one image reproduction unit are provided.

13. The camera system according to claim 1, wherein the control unit is integrated in the image capture unit.

14. The camera system according to claim 1, further comprising at least one reproduction interface between the control unit and the image reproduction unit, which is configured for transmitting at least one video signal from the control unit to the image reproduction unit.

15. The camera system according to claim 14, further comprising at least two reproduction interfaces wherein the at least two reproduction interfaces are electrically and/or signal-technically and/or mechanically compatible.

16. The camera system according to claim 14, wherein the at least one functional interface and the at least one reproduction interface are electrically and/or signal-technically and/or mechanically compatible.

17. The camera system according to claim 1, wherein the control unit is integrated in the image reproduction unit.

18. The camera system according to claim 1, wherein the vehicle function performed by one or both of the first and second functional unit provides at least one additional function for the vehicle and/or the driver of the vehicle, which additional function does not comprise image capturing.

19. The camera system according to claim 18, wherein the plug-in connection is mechanically lockable.

20. The camera system according to claim 1, wherein at least one of the interfaces is sealed against the environment.

21. The camera system according to claim 1, wherein the control unit and/or the first functional unit and/or the image capture unit are disposed in a common housing.

22. A mirror replacement system for a vehicle, in particular a commercial vehicle, having a camera system, the camera system comprising:
- at least one image capture unit for capturing at least one image;
- at least one image reproduction unit for reproducing the at least one image captured by the image capture unit;
- a first functional unit for performing a vehicle function comprising a shutter configured to protect the image capture unit against damage by foreign objects, and a second functional unit for performing a second vehicle function comprising illuminating with Infrared (IR) light an area to be captured by the image capture unit; and
- at least one control unit for outputting at least one control signal,
- wherein the camera system is configured to transmit at least one video signal between the image capture unit and the image reproduction unit and is configured to control the image capture unit and the first and second functional units by use of the same single control signal outputted from the control unit, the same single control signal being passed through the image capture unit to the functional units and being not transmittable back from the functional units to any one of the camera system units,
- wherein at least one functional interface is provided between the at least one image capture unit and the first functional unit, via which functional interface, the at least one image capture unit and the first functional unit are coupleable with each other and decoupleable from each other, wherein the control signal outputted from the control unit is transmitted through the image capture unit to the functional unit and is relayed via the first functional unit to the second functional unit via a common transmission path,
- wherein the vehicle functions performed by the first and second functional units provide at least one additional function for the image capture unit, which additional function comprises a cleaning of optics of the image capture unit for ensuring optimal image acquisition, and wherein a heating is performed by the image capture unit for preventing or removing the generation of condensed water in the image capture unit, and
- wherein the control unit and/or the first functional unit and/or the image capture unit form separated assemblies with respect to their housings.

* * * * *